(12) United States Patent
Healy et al.

(10) Patent No.: US 7,657,177 B2
(45) Date of Patent: Feb. 2, 2010

(54) COMMUNICATIONS TEST RECEIVER

(75) Inventors: David Healy, Stowmarket (GB);
Richard Cronin, Ipswich (GB);
Andrew Bothwell, Ipswich (GB)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 551 days.

(21) Appl. No.: 11/345,517

(22) Filed: Feb. 2, 2006

(65) Prior Publication Data

US 2006/0250141 A1  Nov. 9, 2006

(30) Foreign Application Priority Data

Feb. 3, 2005  (GB) .................. 0502185.2

(51) Int. Cl.
*H04B 10/08*  (2006.01)
(52) U.S. Cl. .............................. 398/24; 398/25; 398/29
(58) Field of Classification Search .................. 398/139, 398/202, 204, 24–29
See application file for complete search history.

(56) References Cited

U.S. PATENT DOCUMENTS

| | | | | |
|---|---|---|---|---|
| 5,796,820 A | * | 8/1998 | Sasada | 379/406.08 |
| 7,310,315 B2 | * | 12/2007 | Horiuchi et al. | 370/241 |
| 7,426,350 B1 | * | 9/2008 | Sun et al. | 398/193 |
| 2002/0154373 A1 | * | 10/2002 | Akashi | 359/189 |
| 2004/0146099 A1 | * | 7/2004 | Denny et al. | 375/229 |
| 2005/0089332 A1 | * | 4/2005 | Margalit | 398/139 |
| 2006/0168483 A1 | * | 7/2006 | Sherlock et al. | 714/43 |

* cited by examiner

*Primary Examiner*—Dzung D Tran

(57) ABSTRACT

Distortion of an optical signal transmitted over a fibre optic link is characterized by a receiver including a photodetector for converting optical radiation into an electrical signal. A delay line delays the electrical signal. At least two delay line taps drive a register that stores plural values corresponding with different delayed replicas of the electrical signal. Signals commensurate with the values are externally provided to a signal distortion analyser for analysis of the values to determine the optical signal distortion.

20 Claims, 3 Drawing Sheets

COMMUNICATIONS TEST RECEIVER

RELATED APPLICATIONS

The present application is based on, and claims priority from, British Application Serial Number 0502185.2, filed Feb. 3, 2005, the disclosure of which is hereby incorporated by reference herein in its entirety

BACKGROUND a. Field of the Invention

The present invention relates to a test receiver unit for receiving and testing a signal transmitted over a communications link, and to a communications system and method that uses a test receiver unit to characterise distortion in a the signal. The signal may be an electrical signal transmitted over an electrical communications link, or an optical signal transmitted over an optical communications link.

b. Related Art

A transmitted signal may be subject to numerous sources of noise and distortion, both in the generation of the signal and its transmission through a communications channel. For example, sources of noise in an optical transmitter or receiver include thermal noise and shot noise. A receiver section of the receiver may also use an avalanche photodiode for high sensitivity, but this will introduce avalanche photodiode noise. The generation of an optical signal will in general be subject to other sources of noise or drift. For example, the output power of a laser diode will be subject to slow drift as it heats up in use or from changes in ambient temperature. Laser diodes and other optical components such as gratings are also very sensitive to optical feedback from back reflections. Such feedback will cause rapid changes in system distortion, which can close the eye pattern in a received signal. In this case the system suffers from intersymbol interference (ISI), which in conjunction with system noise, increases the bit error rate (BER) of the received signal. ISI is interference resulting from the data pattern itself. Such effects may be due to rapid heating or other non-linear or linear effects within the laser source itself, and/or may be due to non-linear variations owing to the use of new or existing multimode optical fibre in an optical communications link. In a multimode optical fibre, different modes have different propagation velocities, which tend to disperse a pulse into adjacent pulses, thereby causing ISI. Pulse dispersion also occurs in single mode fibre, but to a lesser extent. Such effects will therefore tend to close an eye pattern and increase the measured BER at the receiver.

Similarly, electrical signals transmitted in electrical communications links are also subject to sources of noise.

High-speed optical communications links, for example links operating at a data rate of at least 5 Gbit/s, have tended to use single mode optical fibre together with high precision optical fibre connectors. This has been the case even when such links are operating over short distances, such as in local area networks where links are typically of the order of 10 m to 100 m in length, or over medium distances, such as in metro networks where links are typically of the order of 1 km to 10 km in length. While such high speed communications links provide reliable performance at a very low BER, for example $10^{-12}$, there is a need for comparable performance at greatly reduced cost, and in practice this requires the use of multimode optical fibre and cheaper connectors, and preferably also cheaper and potentially less stable sources of optical radiation.

It has also been proposed to use an equaliser circuit to compensate for intersymbol interference, both in receivers for optical signals and receivers for electrical signals. In the case of an optical receiver, such an equaliser circuit receives as an input the output from a photoreceiver including a photodetector circuit, and then generates from this at least two equaliser coefficients. A signal delay line also receives the output from the photodetector circuit. Tapped outputs from the delay line are each multiplied or otherwise combined with one of the equaliser coefficients, and then summed together to generate an equalised output signal. Equalisers in a receiver for electrical signals have a similar structure.

One common approach is to use a least mean squared (LMS) algorithm to generate the equaliser coefficients. Such prior art equalisers use an iterative approach that aims to converge on the correct equaliser coefficients slowly over many hundreds or thousands of repeat calculations. Although it may be possible to achieve higher performance at increased cost and complexity in the equaliser, all such prior art approaches suffer from the limitation that the repetitive and iterative method of calculating the equaliser coefficients imposes a major burden on the complexity of the circuitry and software inside the receiver, and hence also on electrical power consumption by the receiver and consequent cooling requirements for the receiver. These problems are compounded at data rates in excess of about 1 Gbit/s, because of the difficulty and expense of increasing the speed of the equaliser calculations.

For some types of optical receiver and transceiver units, there are de facto industry standards on the total maximum allowable electrical power consumption. In particular, the Small Form-Factor Pluggable (SFP) Transceiver Multisource Agreement (MSA), which includes transceivers with transmission rates up to 5 Gbit/sec, operating over single mode and multimode fibre, specifies a maximum electrical power consumption of 1 W. Several other MSA's e.g. XFP, SFF, Gbic, Xenpak, Xpak, and X2, specify varying levels of electrical power consumption. Such standards are necessary to maintain interchangeability between similar components manufactured by different sources. There are also industry standards on the package size and configuration of such components, necessary to ensure that similar components from different manufacturers are plug-compatible. Such physical constraints limit the amount of passive cooling that may be afforded by heat sinks or cooling fins.

Receivers for electrical signals may suffer from similar limitations.

SUMMARY OF THE INVENTION

It is an object of the present invention to provide a test receiver unit, and a communications system and method using such a test receiver unit, that address the problems cited above.

Accordingly, the invention provides a test receiver unit for receiving and testing a transmitted signal from a communications link, comprising an input for receiving the transmitted signal, at least one delay line arranged to receive an electrical signal from the input and to delay the electrical signal, at least two taps from the delay line(s), a register connected to the delay line(s) via the taps and thereby being arranged to hold a plurality of values corresponding with different delays of the electrical signal, and an output by which said values may be externally provided for analysis of said values.

The transmitted signal may be an electrical signal. Alternatively, the signal may be an optical signal and the communications link may be an optical fibre communications link. In this case, the input may be an optical input for receiving optical radiation from the communications link, the optical input leading a photoreceiver for converting the optical radiation into the electrical signal. The optical fibre communications link may include a single mode optical fibre or a multimode optical fibre.

The term "test receiver unit" as used herein includes not only dedicated receiver units, but also transceiver units that incorporate both receiver and transmitter sections.

The photoreceiver will usually comprise a photodiode and an associated amplifier. The register will normally comprise a digital memory, and may by provided by a microprocessor or an application specific IC that provides other functionality within the receiver unit, such as data decoding, clock recovery, control of an optical transmitter section, or output signal equalisation.

The received signal may be a test signal with a known data pattern. The delayed signal will normally be sampled twice for the minimum data cycle period, although it may in some cases be desirable to sample at a higher rate than this. The data values stored in the register may be represented by 8 to 10 bits. Therefore, the raw data rate into the register will far exceed the actual electronic signal data rate of about 1 to 10 Gbit/s. The register need not, however, provide at the output data values at a high average rate, but may instead buffer and store a data values captured during a limited time period, and then clock these data values out for external analysis by a signal distortion analyser at a much lower average data rate, either in parallel or in serial, e.g. via a coaxial connector or a ribbon cable. This is adequate in a system where the goal is to set or adjust equaliser coefficients either when a receiver unit is first used to receive data from an optical fibre link, or when it is desired either to verify or improve on earlier used equaliser coefficient value.

The calculation of an impulse response in order to set accurate equaliser coefficients can be computationally difficult and time-consuming. There is therefore a significant benefit in being able to capture the data values on the fly, buffer in the register and then clock out and analyse in an external data analyser.

Another benefit of being able to analyse the data values offline is that the calculation of the impulse response also depends on the type of data signal. The external data analyser can therefore be configured to analyse many different types of data pattern.

One method to calculating the impulse response involves collecting data values representing the received waveform with a fibre known to be good (or alternatively using stored values representing a known or idealised waveform) and then comparing these with data values representing the same waveform with distortion as clocked out of the test receiver unit. Both waveforms are then converted into the frequency domain, subtracted one from another, and then converted back into the time domain.

The electrical signal provided by the photoreceiver may be a digital electrical signal. The receiving photodetector generates an analogue electrical signal from the optical radiation, and so an analogue-to-digital (A/D) converter may be provided as part of the photoreceiver to convert the analogue electrical signal into the digital electrical signal. The delay line(s) is/are then digital delay line(s).

Alternatively, the electrical signal may be an analogue electrical signal. In this case, the delay lines(s) is/are analogue delay lines, and the taps (141-14N) each include an A/D converter arranged to convert the delayed analogue electrical signals into corresponding digital electrical signals.

Preferably, the register values are digital values derived directly from the digital electrical signal, for example without the need for any digital processing of the digital electrical signal within the test receiver unit.

The invention is most useful when the test receiver unit comprises an equaliser. The equaliser will hold a plurality of equaliser coefficients that are used to equalise distortion in the received signal. In performing this, the equaliser is arranged to receive a plurality of tap outputs from at the delay line(s) and to apply the equaliser coefficients to the delay line tap outputs in order to generate an equalised output signal. It is a particular advantage of the invention that these tap outputs may be provided from the same taps (141-14N) used to provide the data values representative of the received signal the register.

Because of the relative simplicity of the arrangement, the register and associated circuitry for clocking out or otherwise presenting the data values at the output may be provided on the same integrated circuit as used for other functions within the test receiver unit. Preferably, the delay line(s) used for the register is/are the same delay line(s) used by the equaliser.

In one embodiment of the invention, the test receiver unit is a functional receiver unit for receiving data as part of an optical communications system.

Because the register is relatively simple and will consume little power compared with the total electrical power consumed by the test receiver unit, the unit may be arranged so that the register is always storing and presenting at an output data values. However, it may be desirable to disable the testing function of the test receiver unit when the unit is being used to receive data, or vice versa.

The test receiver unit may comprise means by which the test receiver unit is temporarily placed in a testing mode of operation during which the test receiver unit is not functional to receive data as part of an optical communications system. For example, the unit may have a manual switch for making this change. Another way would be to provide this functionality in firmware embedded within the test receiver unit, for example accessed via an interface connection. Yet another way would be to make the switch between modes of operation automatic, for example upon detection of a particular data pattern from the optical input that would not appear during normal use of a receiver unit, or immediately on initial power up, or following a sufficiently long delay when no data is received by the receiver unit.

The equaliser may be programmable, for example via a unit interface, so that the equaliser coefficients may be altered.

In a preferred embodiment of the invention, the test receiver unit is a transceiver comprising an optical output for transmitting optical radiation to the communications link. The optical output is may then be the output by which the register data values are externally provided for external analysis.

The test receiver unit may plug into a frame, for example a card socket or a receptacle in a rack-mounted unit having a plurality of such sockets on a front panel of the rack. The frame then provides electrical power to the test receiver unit, and provides an interface to the test receiver unit for the onward transmission of received data, or the provision to the test receiver unit of data to be transmitted across an optical communications link from a transmitter section of the unit. The interface may also convey commands used to initiate and control a test sequence by the test receiver unit.

As an alternative to combining the test functionality of the invention within a receiver unit having data receive and optionally also data transmit functionality, the test receiver unit may be a dedicated testing unit to be used only during characterisation of the signal distortion of the optical communications link. The testing unit is then plug-compatible with a functional receiver unit, and having a similar photoreceiver section, but does not necessarily have other circuit components present in a receiver section, such as signal equalisation and output amplification. Then, when a test is to be conducted, a receiver unit not having test functionality is manually removed from its socket, card or rack unit and temporarily replaced with the testing unit. After the test has been conducted, the non-test receiver unit takes the place of the testing unit. Although this may be advantageous when using the invention with an existing communications system having only dedicated receiver units, it is alternatively preferred the test circuitry is incorporated in an otherwise normally functional receiver unit so that it is not necessary to manually swap units when conducting a test for signal distortion.

Also according to the invention, there is provided an communications system, comprising at least one plug-in receiver unit for receiving a transmitted signal from a communications link, comprising an input for receiving the transmitted signal and for providing an input electrical signal, and a frame having a socket into which the receiver unit is removably plugged and by which the receiver unit is supplied with electrical power, wherein the optical communications system comprises additionally a test receiver unit as claimed in any preceding claim, the test receiver unit being plug-compatible with the receiver unit.

The receiver section in the test receiver unit will normally be identical with that in the plug-in receiver unit.

The plug-in receiver unit may comprise an output by which an output electrical signal is externally provided from the receiver unit.

In an illustrated embodiment of the invention, the communications system is an optical communications system comprising at least one plug-in receiver unit for receiving an optical signal from an optical fibre communications link, comprising an optical input for receiving optical radiation from the communications link, and a photoreceiver for converting the optical radiation into an electrical signal.

The invention further provides a testing system for characterising signal distortion in a communications system, comprising a signal distortion analyser, and a test receiver unit according to the invention, wherein:

the test receiver unit is arranged to receive an optical signal transmitted in the optical communications system and to provide to the signal distortion analyser via the output said values; and the signal distortion analyser is arranged to analyse said values in order to determine the distortion in the optical signal.

The signal distortion analyser may be a personal computer (PC). This is particularly useful, as then the data can be collected by the PC and analysed by software running in the PC. Thus the invention provides a very convenient and economical way of using the test receiver unit to characterise optical distortion, for example to calculate improved equaliser coefficients.

The invention additionally provides a method of characterising signal distortion in an testing system for characterising signal distortion in an optical communications system, said testing system being according to the invention, the method comprising the steps of:

i) using the test receiver unit to receive a signal transmitted in the communications system and to provide to the signal distortion analyser via the output said values;

ii) using the signal distortion analyser to analyse said values in order to determine the distortion in the signal.

BRIEF DESCRIPTION OF THE DRAWINGS

The invention will now be further described, by way of example only, and with reference to the accompanying drawings in which.

DETAILED DESCRIPTION

Figure 1:
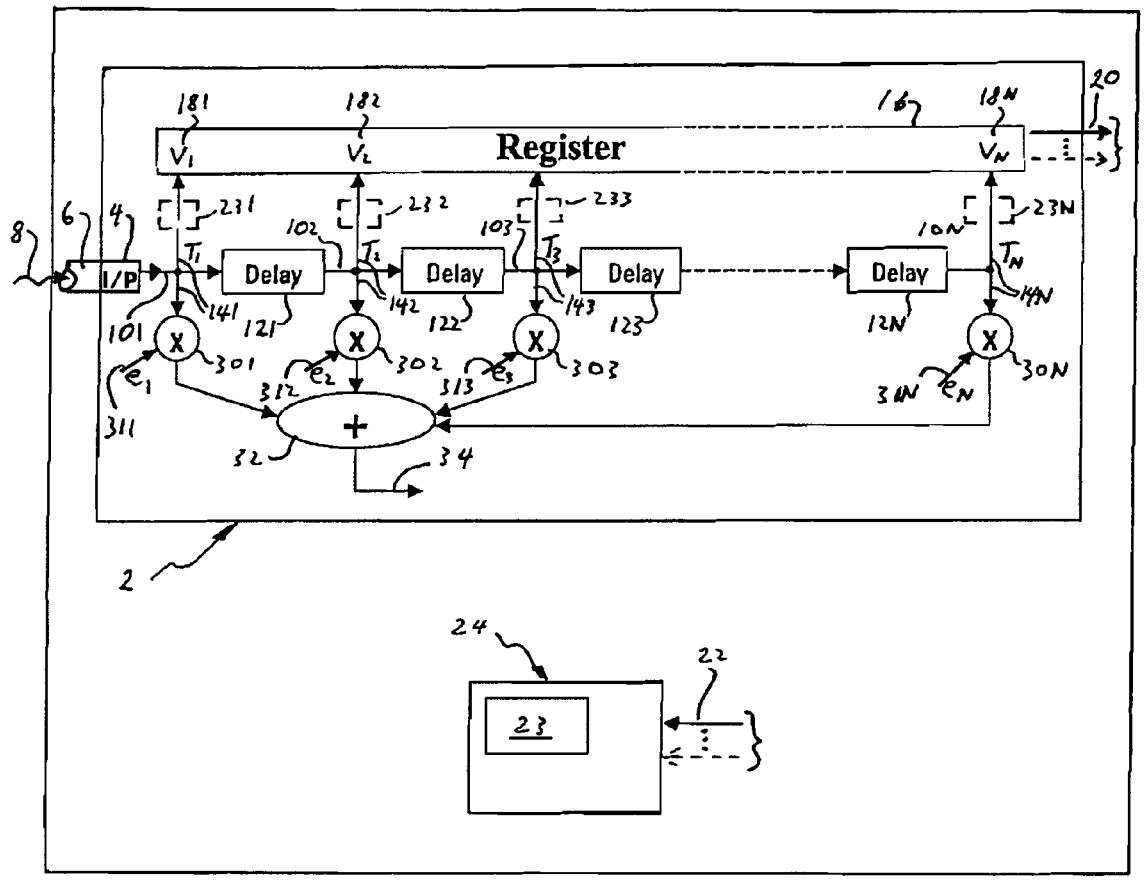
FIG. 1 shows a schematic drawing of a test receiver unit according to a preferred embodiment of the invention, connected to a signal distortion analyser to form a testing system for receiving and testing an optical signal from an optical fibre communications link.

FIG. 1 shows a test system 1 having a test receiver unit 2 for receiving and testing an input optical signal received from an optical fibre 6. The test receiver unit has a photoreceiver input (I/P) 4 for receiving optical radiation 8 from the fibre 6. The optical radiation 8 is modulated to carry an optical signal. The input 4 is conventional, and so will not be described or illustrated in detail, but includes a photodetector and associated amplification circuitry for converting the optical radiation into an electrical signal 101. The electrical signal 101 in this example includes non-random distortion, for example intersymbol interference.

The test receiver unit 2 includes at least one delay line 12$_1$ to 12N arranged to delay the electrical signal 101, at least two taps (T$_1$ to T$_N$) 14$_1$ to 14N from the delay lines 12$_1$-12N by which access is had to delayed electrical signals 10$_2$-10N and optionally also to the un-delayed signal 101. A register 16 is connected to the delay lines 12$_1$-12N via the taps 14$_1$-14N which provide to the register 16 a plurality of data values (V$_1$ to V$_N$) 18$_1$ to 18N corresponding with different delays of the electrical signal 10$_1$-10N. The data values 10$_1$-18N may each comprise about 8 to 10 bits resolution, and represent amplitudes of the delayed signal and times set by the delay lines 12$_1$-12N. The register 16 may be a memory controlled by software within a microprocessor (not shown), and holds the data values 18$_1$-18N temporarily until these are each presented sequentially or in parallel at an output 20 from the test receiver unit 2.

The un-delayed signal 101 may be an analogue signal, or if a analogue-to-digital (A/D) converter is included in the receiver input 4, a digital signal. In the former case, the delay lines 12$_1$-12N are analogue delay lines, and in the latter case, digital delay lines.

Optionally, if the electrical signal 10$_1$-10N is not a digital signal, A/D converters 23$_1$ to 23N may be provided to digitize the delayed signals 10$_1$-10N prior to the digitized values 10$_1$-18N being supplied to the register 16.

The output 20 is connected to an input 22 of a signal distortion analyser 24, which together with the test receiver unit 2 forms the test system 1. The signal distortion analyser may be incorporated in an otherwise conventional personal computer (not shown), for example by means of an expansion card having suitable inputs 22 and controlling data analysis software 23.

Figure 2:
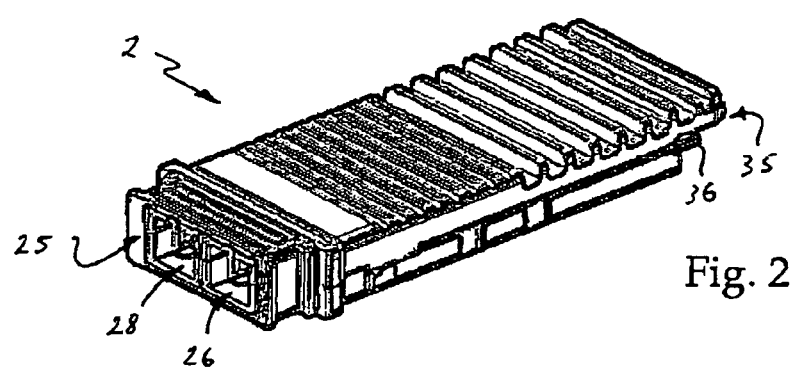
FIG. 2 is a perspective view of the test receiver unit of FIG. 1, showing a casing with receive and transmit ports for connection to optical fibre connectors.

As shown in FIG. 2, in this example, the test receiver unit 2 is also a functional optical transceiver unit, having on a front face 25 an optical input port 26 into which the optical fibre 6 is connected by means of an optical fibre connector (not shown) and leading to the photoreceiver input 4. The unit 2 also has a on the front face 25 immediately adjacent the receive port, a transmit port 28 into which an optical fibre connector (not shown) may be plugged for transmission of an optical signal from the test receiver unit 2.

Referring again to FIG. 1, the test receiver unit 2 includes signal equalisation circuitry, some of which is shown, including the same taps 141-14N used by the register 16. The delayed signals 101-10N at the taps 141-14N are each provided to corresponding multipliers 301 to 30N, which may be analogue or digital multipliers, the signals 101-10N being converted to digital signals if necessary, for example by the same or similar A/Ds to those 231-23N used optionally with the register 16.

Each multiplier 301-30N multiplies the corresponding signal 101-10N by an equaliser coefficient ($e_1$ to $e_N$) 311 to 31N, with the results being summed by a summer 32. The output 34 from the summer 32 is then an equalised output signal with reduced distortion as compared with the original input electrical signal 101.

The equalised signal 34 may be further processed within the test receiver unit 2, or may be provided directly at an output to the unit, which will normally be on a back face 35 of the unit 2, for example at a connector strip or block 36.

Figure 3:
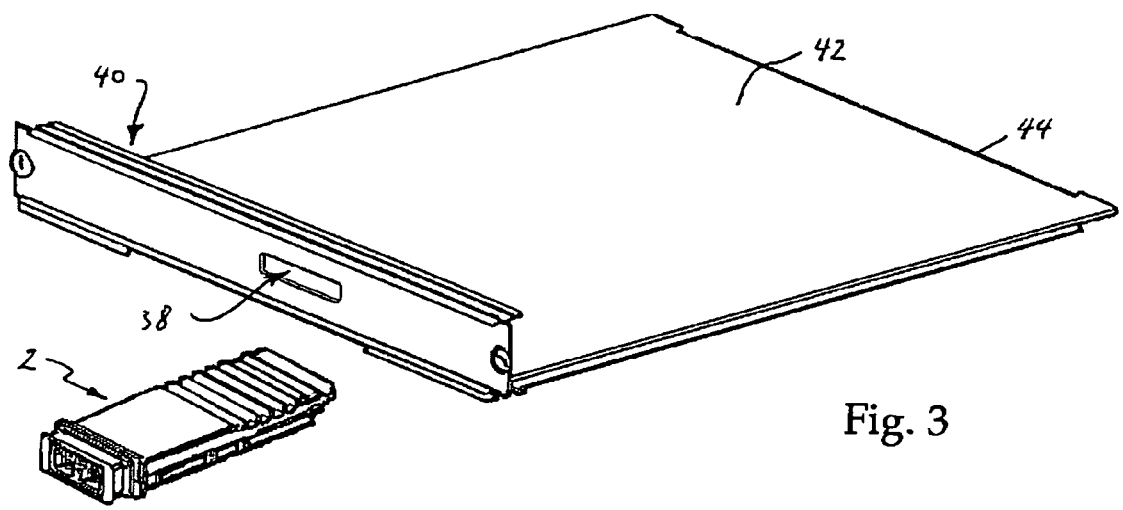
FIG. 3 is a perspective view of the test receiver unit of FIG. 2, showing how the unit plugs into a socket in a face plate of a card for mounting in a rack.

In use, the test receiver unit 2 may be plug-compatible with other similar units not having test functionality, but having the same internal configuration for signal equalisation. Such units 2 may be received within a socket 38 in the front panel of a larger communications unit, a modular portion of which 40 is shown in FIG. 3. The communications unit 40 may include a card 42 or similar components for making electrical connection with the test receiver unit 2.

The output 20 from the register may be provided from the card 42, for example from an edge connector 44. Alternatively, the output 20 may be provided via the transmit socket 28 of the test receiver unit 2.

Figure 4:
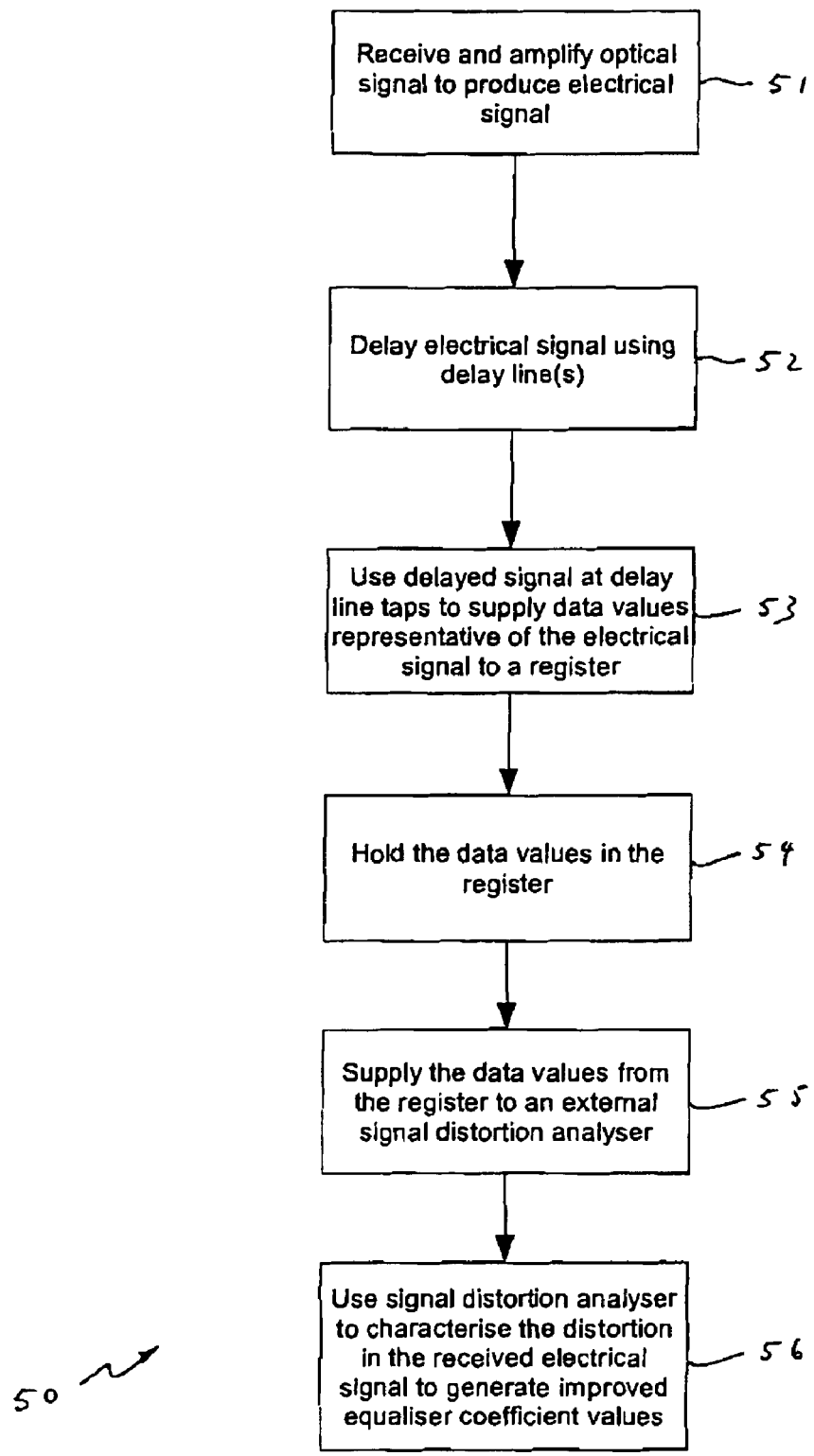
FIG. 4 is a flow chart illustrating a preferred method according to the invention for using the testing system of FIG. 1 to characterise distortion in a received optical signal.

Reference is now made to FIG. 4, which is a flow chart 50 that illustrates the method of using the test receiver unit 2 with the external signal distortion analyser 24. First 51, the unit 2 receives and amplifies the optical signal 8 to produce the electrical signal 101. Then 52, the delay lines 121-12N delay the original signal 101 to produce corresponding delayed signals 102-10N. Following this 53, the delay line taps 141-14N provide the data values 181-18N representative of the electrical signals 101-10N at those taps to the register 16. The register 16 holds 54 the data values 181-18N until these are supplied 55 to the external signal distortion analyser 24, which then characterises the distortion in the received electrical signal 101, for example to generate improved equaliser coefficient values which may then be provided to the test receiver unit 2 as updated equaliser coefficient values 311-31N.

As data rate and link lengths increase, the invention provides a convenient and economical way to assess signal distortion. Particularly with multimode optical fibre links there may be a great deal of variability in channel characteristics, with complex signal distortions. The invention provides the ability to make quick measurement, without the need for highly specialised equipment and without having to disable a communications link for a long period of time. When a link must be disabled, then the quick nature of the measurements means that the link can be restored in a short time. Because of the convenience provided by the invenion, tests may be performed more frequently, and as a result it is possible to operate an optical communications link at a higher data rate closer to the theoretical maximum and therefore with a narrower margin without the risk of link failure.

A particular benefit of the invention is that it permits the use of a large base of installed multimode fibre at a higher data rate, thereby relieving the need to install new single mode fibre transmission links, for example when upgrading an existing multimode link to a transmission data rate of 10 Gbits/s.

The invention therefore provides an improved test receiver unit for an optical fibre communications system suitable for receiving and testing for distortion an optical signal that may have been degraded during its generation and/or propagation in an optical communications channel leading to the receiver.

It is to be recognized that various alterations, modifications, and/or additions may be introduced into the constructions and arrangements of parts described above without departing from the scope of the present invention, as defined by the appended claims. In particular, the same techniques described above in relation to an optical signal and a test receiver for use in an optical communications system are equally applicable to the testing of a transmitted electrical signal, for example in a coaxial cable communications system.

The invention claimed is:

1. A test receiver unit for receiving and testing a transmitted signal from a communications link, comprising an input for receiving the transmitted signal, a plurality of delay lines coupled in series to the input and arranged to receive an electrical signal from the input and to delay the electrical signal, at least two taps from the delay line(s), a register connected to the delay line(s) via the taps and arranged to hold a plurality of values corresponding with different delays of the electrical signal, and an output for deriving signals commensurate with said values, wherein the output is arranged to provide said signals commensurate with said values to a distortion analyser configured to determine the distortion in the electrical signal based on said signals commensurate with said values, and wherein the output of the signal distortion analyser provides undated equaliser coefficients to an equaliser configured to receive a plurality of tap outputs from the delay line(s) and configured to apply the equaliser coefficients to the delay line tap outputs to generate an equalised output signal.

2. A test receiver unit as claimed in claim 1, wherein the electrical signal is a digital electrical signal, the input comprising an analogue-to-digital converter arranged to convert a received analogue electrical signal into the digital electrical signal, and said delay line(s) is/are a digital delay for delaying the digital electrical signal.

3. A test receiver unit as claimed in claim 1, wherein the electrical signal is an analogue electrical signal, the delay lines(s) is/are analogue delay lines, and the taps each include an analogue-to-digital converter arranged to convert the delayed analogue electrical signals into corresponding digital electrical signals.

4. A test receiver unit as claimed in claim 3, wherein said values are digital values derived directly from the digital electrical signal.

5. A test receiver unit as claimed in claim 4, comprising an equaliser, the equaliser being arranged for holding a plurality of equaliser coefficients and for receiving a plurality of tap outputs from at said delay line(s) and for applying the equaliser coefficients to said delay line tap outputs to generate an equalised output signal.

6. A test receiver unit as claimed in claim 5, wherein said tap outputs are arranged to be derived from said at least two taps.

7. A test receiver unit as claimed in claim 6, wherein the test receiver unit includes a functional receiver unit for receiving data as part of a communications system.

8. A test receiver unit as claimed in claim 7, comprising means for the test receiver unit to be temporarily placed in a testing mode of operation during which the test receiver unit is not functional to receive data as part of a communications system.

9. A test receiver unit as claimed in claim 7, comprising means for the test receiver unit may be temporarily placing in a testing mode of operation during which the test receiver unit is not functional to receive data as part of a communications system.

10. A test receiver unit as claimed in claim 6, wherein the test receiver unit includes a functional receiver unit for receiving data as part of a communications system.

11. A test receiver unit as claimed in claim 5, wherein the equaliser is programmable so that said equaliser coefficients can be altered.

12. A test receiver unit as claimed in claim 5, wherein said tap outputs are arranged to be derived from said at least two taps.

13. A test receiver unit as claimed in claim 1, comprising an output for transmitting an output signal to the communications link, wherein the output is the output for deriving the signals commensurate with said values.

14. A test receiver unit as claimed in claim 1, wherein the signal is an optical signal, the communications link is an optical fibre communications link, the input is an optical input for receiving optical radiation from the communications link, the optical input leading to a photoreceiver for converting the optical radiation into the electrical signal.

15. A communications system, comprising at least one plug-in receiver unit for receiving a transmitted signal from a communications link, comprising an input for receiving the transmitted signal and for providing an input electrical signal, and a frame having a socket into which the receiver unit is removably plugged and for supplying electrical power to the receiver unit, wherein the optical communications system comprises a test receiver unit as claimed in claim 14, the test receiver unit being plug-compatible with the receiver unit.

16. A testing system for characterising signal distortion in a communications system, comprising a signal distortion analyser, and a test receiver unit as claimed in claim 14, wherein:
the test receiver unit is arranged to receive an optical signal transmitted in the optical communications system and to provide said signals commensurate with the values to the signal distortion analyser via the output said signals commensurate with the values; and
the signal distortion analyser is arranged to analyse said values to determine the distortion in the optical signal.

17. A testing system for characterising signal distortion in a communications system, comprising a signal distortion analyser, and a test receiver unit as claimed in claim 1, wherein: the test receiver unit is arranged to receive an optical signal transmitted in the optical communications system and to provide said signals commensurate with the values to the signal distortion analyser via the output, said signals commensurate with the values; and the signal distortion analyser is arranged to analyse said values to determine the distortion in the optical signal.

18. A communications system, comprising at least one plug-in receiver unit for receiving a transmitted signal from a communications link, comprising an input for receiving the transmitted signal and for providing an input electrical signal, and a frame having a socket into which the receiver unit is removably plugged and for supplying electrical power to the receiver unit, wherein the optical communications system comprises a test receiver unit as claimed in claim 1, the test receiver unit being plug-compatible with the receiver unit.

19. A test receiver unit as claimed in claim 1, comprising an equaliser, the equaliser being arranged for holding a plurality of equaliser coefficients and for receiving a plurality of tap outputs from at said delay line(s) and for applying the equaliser coefficients to said delay line tap outputs to generate an equalised output signal.

20. A method of characterising signal distortion in a testing system for characterising signal distortion in an optical communications system, wherein the testing system includes a signal distortion analyser, and a test receiver unit comprising an input for receiving the transmitted signal, a plurality of delay lines coupled in series to the input and arranged to receive an electrical signal from the input and to delay the electrical signal, at least two taps from the delay line(s), a register connected to the delay line(s) via the taps and arranged to hold a plurality of values corresponding with different delays of the electrical signal, and an output for deriving signals commensurate with said values, wherein the test receiver unit is arranged to receive an optical signal transmitted in the optical communications system and to provide said signals commensurate with the values to the signal distortion analyser via the output said signals commensurate with the values and wherein the signal distortion analyser is arranged to analyse said values to determine the distortion in the optical signal,
the method comprising the steps of:
i) using the test receiver unit to receive a signal transmitted in the communications system and to provide to the signal distortion analyser via the output said signals commensurate with the values; and
ii) using the signal distortion analyser to analyse said values to determine the distortion in the signal, wherein the output of the signal distortion analyser provides updated equaliser coefficients to an equaliser configured to receive a plurality of tap outputs from the delay line(s) and configured to apply the equaliser coefficients to the delay line tap outputs to generate an equalised output signal.

* * * * *